(12) United States Patent
Yamaguchi et al.

(10) Patent No.: US 6,995,755 B2
(45) Date of Patent: Feb. 7, 2006

(54) DISPLAY CONTROLLER, DISPLAY CONTROL METHOD, DRIVE CONTROLLER AND DRIVE CONTROL METHOD

(75) Inventors: Takamasa Yamaguchi, Saitama (JP); Hitoshi Sato, Saitama (JP); Yukari Mizumura, Saitama (JP); Rie Yamashita, Saitama (JP); Hidetsugu Kubota, Saitama (JP); Toshiyuki Murata, Saitama (JP)

(73) Assignee: Pioneer Corporation, Tokyo (JP)

( * ) Notice: Subject to any disclaimer, the term of this patent is extended or adjusted under 35 U.S.C. 154(b) by 283 days.

(21) Appl. No.: 10/327,921

(22) Filed: Dec. 26, 2002

(65) Prior Publication Data

US 2003/0125873 A1    Jul. 3, 2003

(30) Foreign Application Priority Data

Dec. 28, 2001   (JP)   ............... P.2001-401691

(51) Int. Cl.
*G09G 5/00*   (2006.01)

(52) U.S. Cl. ............... 345/204; 385/110; 701/200
(58) Field of Classification Search ............... 345/108, 345/110, 204; 701/200, 211; 340/988, 995
See application file for complete search history.

(56) References Cited

U.S. PATENT DOCUMENTS

| | | | |
|---|---|---|---|
| 6,181,996 B1 * | 1/2001 | Chou et al. | 701/36 |
| 6,356,812 B1 * | 3/2002 | Cragun | 701/1 |
| 6,717,287 B2 * | 4/2004 | Tengler et al. | 307/10.1 |
| 6,801,852 B2 * | 10/2004 | Takahashi et al. | 701/211 |
| 2003/0122782 A1 * | 7/2003 | Yamaguchi et al. | 345/158 |
| 2004/0204823 A1 * | 10/2004 | Hashimoto | 701/200 |
| 2005/0055154 A1 * | 3/2005 | Tanaka et al. | 701/200 |

FOREIGN PATENT DOCUMENTS

| | | |
|---|---|---|
| DE | 42 13 129 A1 | 10/1993 |
| DE | 196 33 417 C1 | 12/1997 |
| JP | 03-118251 | 5/1991 |
| JP | 04-224432 | 8/1992 |

* cited by examiner

*Primary Examiner*—Dennis-Doon Chow
*Assistant Examiner*—Tom Sheng
(74) *Attorney, Agent, or Firm*—Morgan, Lewis & Bockius LLP (57) ABSTRACT

A display controller for controlling display on a display surface of a display unit mounted on a vehicle. The display unit is rotatably mounted on the vehicle. A CPU of a controller recognizing that the vehicle is traveling, that a display surface of a display unit is oriented toward the driver's seat, and that a moving picture is displayed on the display surface, inhibits display of the moving picture on the display unit. The CPU of the controller, recognizing that the vehicle is traveling, that the display surface of the display unit is oriented toward the driver's seat, and that a moving picture is displayed on the display surface rotates the display unit to a position where an occupant of the driver's seat cannot watch the moving picture.

6 Claims, 7 Drawing Sheets

DISPLAY CONTROLLER, DISPLAY CONTROL METHOD, DRIVE CONTROLLER AND DRIVE CONTROL METHOD

BACKGROUND OF THE INVENTION

1. Field of the Invention

The present invention relates to a display controller and a display control method for controlling display on a display surface of a display unit mounted on a vehicle, as well as a drive controller and a drive control method for controlling a display unit to change the orientation of a display surface of a display unit mounted on a vehicle.

The present disclosure relates to the subject matter contained in Japanese Patent Application No. 2001-401691 filed Dec. 28, 2001, which is incorporated herein by reference in its entirety.

2. Background Art

A configuration of a related art display controller is known to control display on a display surface of a display unit mounted on a vehicle in accordance with the travel of a vehicle in order to secure stable travel of the vehicle. For example, such a display controller detects whether a vehicle is traveling or halted based on a switch for detecting the operation of a parking brake of an automobile as a vehicle and a vehicle speed pulse for detecting the vehicle speed. In case the vehicle is traveling, restriction on display during traveling such as "ATTENTION" is shown on a display surface of a display unit while moving pictures received via a television receiver or moving pictures acquired from recording media such as optical discs are inhibited from being displayed on a display surface of a display unit.

According to a related art display processor to execute display processing, an occupant not involved in driving a vehicle seated next to the driver cannot watch moving pictures either which are displayed on a display surface of a display unit.

A related art display unit is known where the orientation of its display surface can be changed. For the display unit, the orientation of its display surface is manually directed to the front passenger seat so that the display surface will not be seen by the driver seated in the driver's seat while the vehicle is traveling.

The display unit, however, requires manual operation of orienting the display surface of a display unit toward the front passenger seat, which operation is cumbersome.

As mentioned earlier, according to a related art display controller, an occupant not involved in driving a vehicle seated in the front passenger seat cannot watch moving pictures either which are displayed on a display surface of a display unit. For a related art display unit where the orientation of its display surface can be changed, the display surface must be manually oriented away from an occupant seated in a driver's seat during traveling, which operation is cumbersome.

SUMMARY OF THE INVENTION

The invention has been proposed in view of the aforementioned problems and aims at providing a display controller, a display control method, a drive controller and a drive control method whereby occupants other than the occupant seated in a driver's seat can readily watch moving pictures without affecting the travel of a vehicle. A display controller according to the invention includes a display, a travel state detector, a drive section, an orientation detector, a determination section, and a controller. The display is mounted on a vehicle, having a display surface to display at least moving pictures. The travel state detector detects a travel or a halt of the vehicle. The drive section drives the display to change an orientation of the display surface. The orientation detector detects the orientation of the display surface. The determination section determines whether a picture displayed on the display surface is a moving picture. The controller that inhibits display of a moving picture displayed on the display surface when travel of the vehicle is detected, and the picture displayed on the display surface is determined to be a moving picture, and the orientation of the display surface is detected to be toward an occupant seated in a driver's seat of the vehicle.

Preferably, the display controller includes a seating position detector that detects seating position of at least one of occupants of a vehicle. The controller cancels inhibition of display of the moving picture when the occupant is detected to be seated on a front passenger seat of the vehicle and the orientation of the display surface is detected to be oriented toward the occupant seated on the front passenger seat.

According to the invention, a drive controller includes a display, a drive section, an orientation detector, a determination section, and a controller.

The display is mounted on a vehicle and has a display surface to display at least moving pictures. The drive section drives the display to change an orientation of the display surface. The orientation detector detects the orientation of the display surface. The determination section determines whether the picture displayed on the display surface is a moving picture. The travel state detector detects a travel or a halt of the vehicle. The controller performs drive control of the display so as to orient the display surface to a position where an occupant in a driver's seat cannot watch the display surface, when travel of the vehicle is detected, and the picture displayed on the display surface is determined to be a moving picture, and the orientation of the display surface is detected to be toward an occupant seated in the driver's seat of the vehicle.

Preferably, the drive controller includes a seating position detector that detects a seating position of at least one of the occupants of the vehicle. The controller performs drive control of the display to a position where the display surface is oriented toward the occupant of a front passenger seat of the vehicle on detecting that the occupant is seated on the front passenger seat.

According to the invention, a display control method for controlling display on a display surface of display mounted on a vehicle, wherein the display surface of the display is displayed at least moving picture and is driven to change an orientation thereof, includes: detecting a travel or a halt of the vehicle; determining whether the picture displayed on the display surface is a moving picture; detecting the orientation of the display surface; and inhibiting display of the moving picture on detecting that the vehicle is traveling, and that the picture displayed on the display surface is a moving picture, and that the orientation of the display surface is toward an occupant seated in a driver's seat of the vehicle.

According to the invention, the drive control method for performing drive control of display mounted on a vehicle, wherein the display has a display surface to display at least moving pictures, and the drive control includes a change in the orientation of the display surface, includes: detecting a travel or a halt of the vehicle; determining whether the picture displayed on the display surface is a moving picture; detecting the orientation of the display surface; and driving the display to orient the display surface so that an occupant in a driver's seat cannot watch the display surface on detecting that the vehicle is traveling, and that the picture displayed on the display surface is a moving picture, and that the orientation of the display surface toward an occupant seated in the driver's seat.

DETAILED DESCRIPTION OF THE PREFERRED EMBODIMENTS

An embodiment of the invention will be described referring to the drawings.

(First Embodiment)

Figure 1:
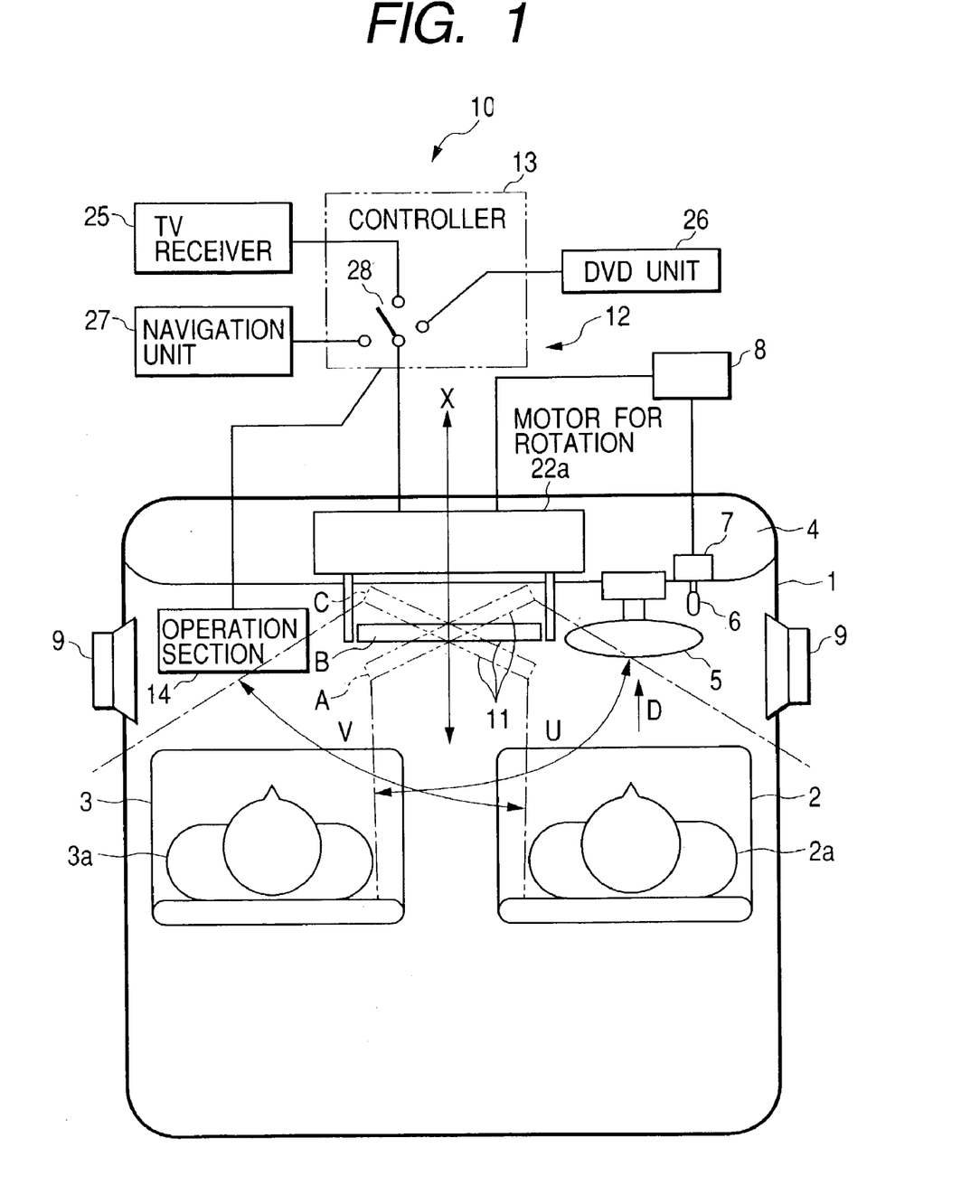
FIG. 1 is a schematic diagram showing the general configuration of a vehicle-mounted display unit according to an embodiment of the invention.

FIG. 1 is a schematic diagram broadly showing a vehicle mounting a display controller and a drive controller in this embodiment. In FIG. 1, a numeral 1 denotes a vehicle for example as an automobile. The vehicle 1 includes a driver's seat 2 and a front passenger seat 3. The vehicle 1 is provided with a dashboard 4.

The dashboard 4 is provided with various meters (not shown) such as a speedometer in front of (in the direction of arrow D in FIG. 1) the driver's seat 2, and a steering wheel 5 for steering the vehicle 1. On the dashboard 4 is attached a driving key 6 for starting the engine of the vehicle 1 in front of the driver's seat 2, and an accessory switch 7 turned on/off by operating the driving key 6. Turning on/off the accessory switch 7 supplies power as accessory (Acc) power from a battery 8 mounted on the vehicle 1. On the dashboard 4 is provided storage space (not shown) before the front passenger seat 3.

The vehicle 1 includes a door (not shown) opened/closed for an occupant 2a seated in the driver's seat 2 of the vehicle 1 and a door (not shown) opened/closed for an occupant 3a seated in the passenger seat 3. These doors are respectively provided with speakers 9.

The vehicle 1 is provided with a vehicle-mounted display unit 10. The vehicle-mounted display unit 10 is arranged in the approximate center of the dashboard 4, that is, between various meters and storage space before the center position of the driver's seat 2 and seat next to the driver 3. The vehicle-mounted display unit 10 comprises a display unit 11, a display unit mounting section 12, a controller 13, and a drive unit.

Figure 2:
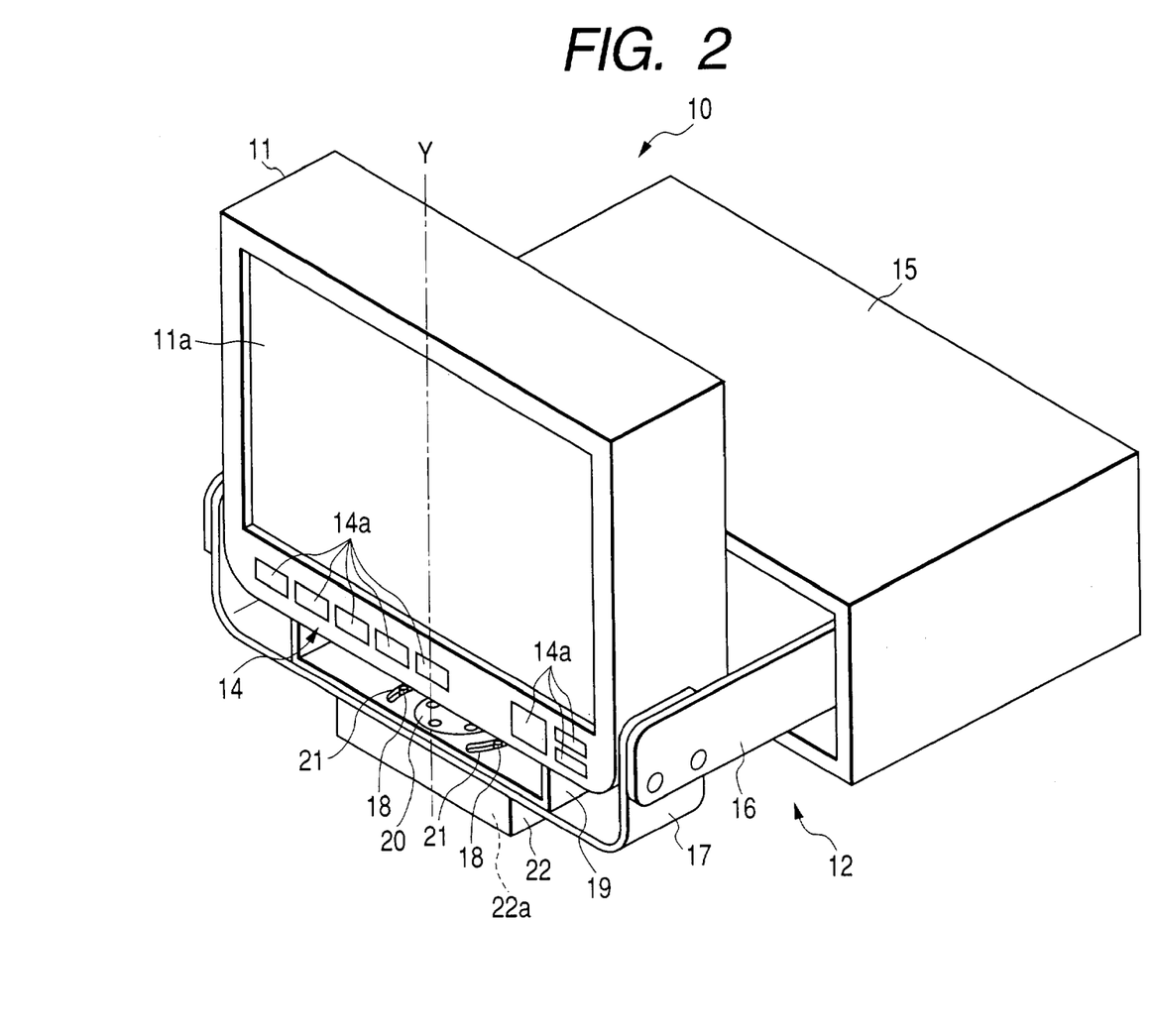
FIG. 2 is a perspective view showing a vehicle-mounted display unit according to the embodiment.

As shown in FIG. 2, the display unit 11 includes a display surface 1a where moving pictures are at least displayed, and composed of for example a liquid crystal display or an organic EL display. The display unit 11 is provided with an operation section 14 having various operation buttons 14a including for example a source selector button for selecting the picture displayed on the display surface 11a and a volume control button for setting the volume level.

The display unit mounting section 12 includes a main body case 15 of an approximate box shape embedded into the dashboard 4. On the main unit case 15 is provided a pair of arms 16. On these arms 16 are mounted a pedestal 17. The pedestal 17 is in the shape of an elongated plate, the ends of which in the longitudinal direction are coupled to the tip of each arm 16 and bridging across the arms 16.

On the pedestal 17 are provided two guide pins 118 protruding upward. Also, on the pedestal 17 is rotatably mounted a rotary plate 19. On the rotary plate 19 are provided a pair of guide holes 21 formed in the shape of arc which the guide pins 18 engage slidably. The rotary plate 19 is mounted on the pedestal 17 rotatably within a predetermined angle range. With the rotary plate 19 is integrated a display unit 11, orientation of whose display surface 11a can be changed via the rotation of the rotary plate 19.

On the pedestal 17 is provided, opposite to the side where the rotary plate 19 is mounted, a rotary box 22 accommodating a motor for rotation 22a for rotating the rotary plate 19 for changing the orientation of the display surface 11a of the display unit 11. The rotary box 22 accommodates, as well as the motor for rotation 22a, a transmission member for transmitting a drive force to a vertical drive axis extended from the mounting plate 20 into the rotary box 22, in order to rotate the rotary plate 19 by way of drive by the motor for rotation 22a. The transmission member is composed of for example a plurality of gear trains. The motor for rotation 22a is driven by a power supplied using a flexible cable from the accessory power source.

The rotary plate 19 is rotated as driven by the motor for rotation 22a, which changes the orientation of the display surface 11a of the display means 11. For example, as shown in FIG. 1, the orientation of the display surface 1a is changed, to a position where mainly the occupant 2a in the driver's seat 2 can recognize the display surface 11a, that is, a first position A where the direction X perpendicular to the center axis Y of the display surface 11a is directed to the driver's seat 2, to a position where mainly the occupant 2a of the driver's seat 2 and the occupant 3a of the front passenger seat 3 can recognize the display surface 11a, that is, a second position B where the direction X perpendicular to the center axis Y of the display surface 11a is directed to the middle position between the driver's seat 2 and the front passenger seat 3, or to a position where mainly the occupant 3a in the front passenger seat 3 can recognize the display surface 11a, that is, a third position C where the direction X perpendicular to the center axis Y of the display surface 11a is directed to the front passenger seat 3.

On the pedestal 17 are arranged a pair of switches (not shown). These switches are turned on/off as required in correspondence with the position where the display surface 11a of the display unit 11 is oriented.

To the controller 13 are connected for example a television receiver 25 for outputting a TV picture to the display unit 11, a DVD unit 26 for displaying the picture information from a DVD as an optical disc working as a storage medium onto the display unit, and a navigation unit 27. On the controller 13 is provided an input picture selector switch 28 to select between input pictures from the television receiver 25, DVD unit 26 and navigation unit 27. The input picture selector switch 28 is changed over by the input operation on the operation section 14. Further, a speaker 9 is connected to the controller 13.

To the controller 13 is connected the motor for rotation 22a in the rotary box 22 on the display unit mounting section 12. The controller 13 performs drive control of the motor for rotation 22a as required. That is, the controller 13 performs drive control of the motor for rotation 22a so that the display surface 11a of the display unit 11 will be oriented toward one of the aforementioned three positions, based on the drive conditions shown in Table 1.

TABLE 1

| Current position of the display unit | Position the display unit will be oriented to | Number of rotations of the motor for rotation | Rotating direction of the motor for rotation |
| --- | --- | --- | --- |
| First position A | Second position B | aaa | Positive |
| | Third position C | bbb | Positive |
| Second position B | First position A | aaa | Negative |
| | Third position C | ccc | Positive |
| Third position C | Second position B | ccc | Negative |
| | First position A | bbb | Negative |

Further, the aforementioned pair of switches are connected to the controller 13. The controller 13 recognizes the current position of the display unit 11 by way of these pair of switches. By recognizing the current position of the display unit 11, the controller 13 controls the number of rotations and rotating direction of the motor for rotation 22a required to rotate the display 11 by a predetermined angle so that the display surface 11a of the display unit 11 will be oriented in a predetermined direction.

In particular, a pair of switches arranged on the pedestal 17 are respectively provided in positions where they are turned on by the rotary plate 19 when the display unit 11 is rotated toward the driver's seat 2 and the front passenger seat 3 by a predetermined angle. Depending the on/off state of each switch and operating state of the motor for rotation 22a, the controller 13 recognizes the current position (drive position) of the display unit 11. Table 2 shows the relationship between on/off of these switches and the current position of the display unit 11.

TABLE 2

| Switch on the driver's seat | Switch on the front passenger seat | Motor for rotation | Current position of the display unit |
| --- | --- | --- | --- |
| On | Off | Halted | First position A |
| Off | Off | Halted | Second position B |
| Off | On | Halted | Third position C |
| Off | Off | In rotation | In rotation |

Figure 3:
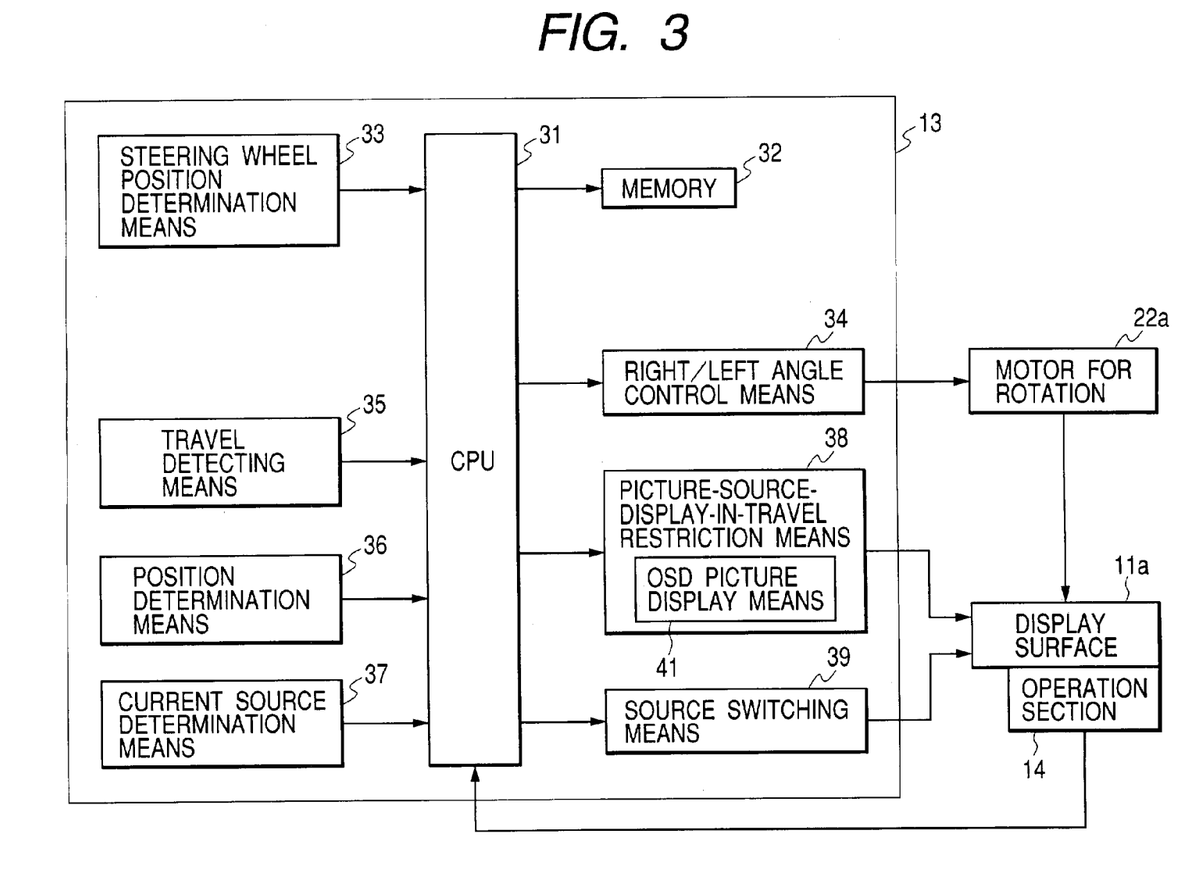
FIG. 3 is a block diagram showing a controller according to the embodiment.

As shown in FIG. 3, the controller 13 includes a Central Processing Unit (CPU) 31 as a computer, a memory 32, steering wheel position determination means 33, right/left angle control means 34, travel detecting means 35, position determination means 36 for determining the current position of the display unit 11, source determination means 37, display-in-travel restriction means 38, and source switching means 39.

To the CPU 31 is connected the memory 32 for storing various information in a readable way. In the memory 32 is stored data indicating the drive conditions in Table 1 for rotating the motor for rotation 22a at a predetermined number of rotations in a predetermined direction and data indicating the current position of the display unit 11.

The steering wheel position determination means 33 is connected to the CPU 31 and composed of for example a selector switch (not shown) on the display unit 11. The steering wheel position determination means 33 sets, by way of the operation of the selector switch, whether the position of the driver's seat 2 is on the right or left side in the travel direction of the vehicle 1, that is, whether the steering wheel 5 is a right-hand steering wheel or a left-hand steering wheel. The position of the steering wheel 5 thus set is stored in the memory 32. The embodiment in table 2 assumes that the steering wheel position determination means 33 has set the right-hand steering wheel. In case it has set the left-hand steering wheel, "Positive" and "Negative" in the rotating direction of the motor for rotation 22a are reversed.

The right/left angle control means 34 is connected to the CPU 31. The right/left angle control means 34 drives the motor for rotation 22a based on the data indicating the drive conditions read by the CPU 31 from the memory 32.

The travel detecting means 35 is connected to the CPU 31. The travel detecting means 35 detects whether the vehicle is traveling or halted based on for example on/off of the switch for detecting the operation of the parking brake of the vehicle 1, on/off of the switch for detecting the parking position of an automatic vehicle, or a vehicle speed pulse for detecting the speed of the vehicle 1. The travel detecting means 35, on detecting that the vehicle 1 is traveling, outputs a corresponding signal to the CPU 31.

The position determination means 36 is constituted of a pair of switches arranged on the pedestal 17 and a detector section for detecting the operating state of the motor for rotation 22a. The position determination means 36 determines the current position of the display unit 11 based on the on/off state of the pair of switches and the operating state of the motor for rotation 22a detected by the detector section. Then the position determination means 36 outputs the determined information to the CPU 31.

The source determination means 37 is connected to the CPU 31. The source determination means 37 determines the picture contents displayed on the display unit 1 and outputs the corresponding information to the CPU 31. The picture contents determined by the source determination means 37 may be a moving picture acquired by the TV receiver 25, a moving picture read from a storage medium such as an optical disc by using a DVD unit 26, or a non-consecutive still picture to intermittently switch between still pictures as in frame-by-frame advance including a text picture, a still picture, and map information displayed on the navigation unit 27. That is, the source determination means 37 determines the type of source based on the source selected by the source selector button on the operation section 14. The input picture selector switch 28 is changed over depending on the operation of the source selector button.

The display-in-travel restriction means 38 comprises OSD (On Screen Display) picture display means 41. The OSD picture display means 41 comprises a feature to display text information such as "ATTENTION" and "Enjoy audio information while traveling" and a still picture such as a background picture. The display-in-travel restriction means 38 recognizes a predetermined signal from the CPU 31 and uses the OSD picture display means 41 to display a still picture on the display surface 11a of the display unit 11.

The source switching means 39 is connected to the CPU 31. The source switching means 39 recognizes a predetermined signal from the CPU 31 that has recognized input operation on the operation section 14 to change over the input picture selector switch 28.

The controller 13 controls the picture displayed on the display unit 11 by the display-in-travel restriction means 38 based on the travel state of the vehicle 1 detected by the travel detecting means 35, the current position of the display unit 11 determined by the position determination means 36, and the picture displayed on the display unit 11 detected by the source determination means 37, or uses the right/left angle control means 34 to control the motor for rotation 22a to change the orientation of the display surface 11a of the display unit 11.

Figure 4:
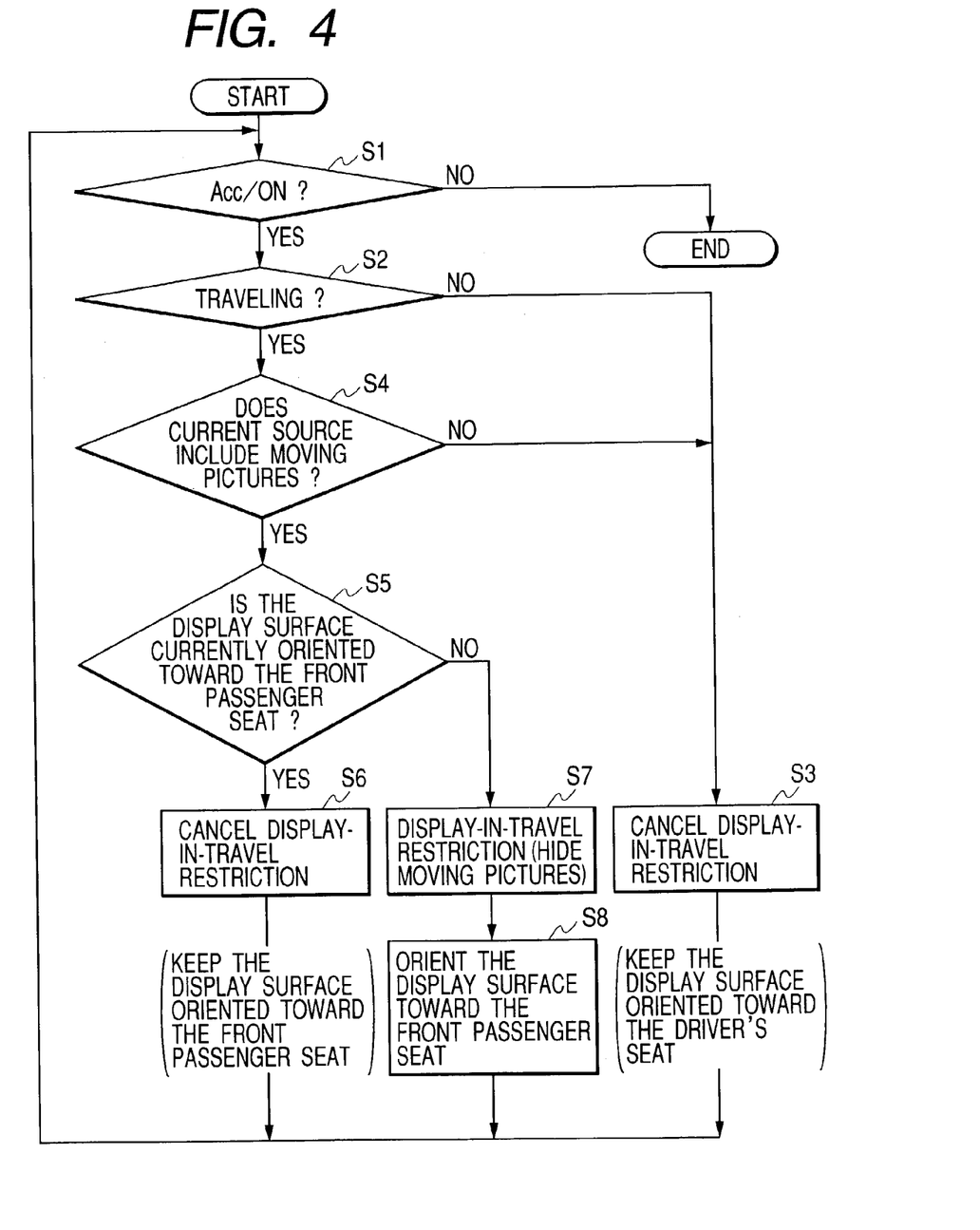
FIG. 4 is a flowchart showing the operation of a vehicle-mounted display unit according to the embodiment.

Next, the operation of the vehicle-mounted display unit 10 will be described referring to the flowchart in FIG. 4.

An occupant 2a gets on the vehicle 1, is seated in the driver's seat 2, and operates the driving key 6 to turn on the accessory switch 7 of the vehicle 1. When the accessory switch 7 is turned on, power is supplied to the vehicle-mounted display unit 10 from the battery 8. This causes the CPU 31 of the controller 13 to recognize that the accessory switch 7 is on and power is supplied (step S1).

Then, the CPU 31 of the controller 13 reads, from the memory 32, the control procedure of the motor for rotation 22a shown in Table 1 to orient the display surface 1a of the display unit 11 to the first position A facing the driver's seat 2. The CPU 31 controls the right/left angle control means 34 to perform drive control of the motor for rotation 22a at a predetermined number of rotations in a predetermined direction based on the control procedure thus read. The drive control of the motor for rotation 22a causes the rotary plate 19 to rotate by a predetermined angle in a predetermined direction thus bringing the display surface 11a of the display unit 11 to the first position A facing the driver's seat 2 in FIG. 1. In case the CPU 31 has determined that the current position of the display unit 11 is the first position A, the CPU 31 skips drive control of the motor for rotation 22a.

The steering wheel position determination means 33 sets and stores in the memory 32 in advance the information that the vehicle is right-hand drive. Thus, the CPU 31 drives the motor for rotation 22a so that the display unit 11 will rotate by a predetermined angle leftward toward the rear of the vehicle 1 for example in the case of a right-hand drive vehicle shown in FIG. 1, based on the data indicating the drive conditions and position information of the steering wheel 5 read from the memory 32.

The CPU 31 of the controller 13 recognizes the travel state of the vehicle 1 detected by the travel detecting means 35, that is, whether the vehicle is traveling or halted (step S2). In case the CPU has determined that the vehicle is not traveling, that is, the vehicle is halted in step S2, the CPU 31 cancels display restriction by the display-in-travel restriction means 38 and displays a moving picture such as a TV picture on the display surface 11a of the display unit 11 (step S3). The CPU 31 recognizes that the display unit 11 is in the first position A in FIG. 1 where the display surface 11a faces the driver's seat 2, as determined by the position determination means 36, then skips the control by the right/left angle control means 34 and returns to step S1 while keeping the current state unchanged.

In case the CPU 31 has recognized that the travel detecting means 35 detected traveling of the vehicle 1 in step S2, the CPU 31 uses the source determination means 37 to determine the picture displayed on the display surface 11a of the display unit 11, that is, whether the picture is a moving picture (step S4). In case the source determination means 37 has detected that a moving picture is not displayed, the CPU 31 determines that the picture displayed on the display surface 11a is a still picture such as map information and text picture from the navigation unit 27 and executes step S3 to continue display of the still picture.

In case the CPU 31 has recognized that a moving picture such as a TV picture is displayed by way of the source determination means 37 in step S4, the CPU 31 uses the position determination means 36 to determine the current position of the display unit 11. That is, The CPU 31 determines whether the display surface 11a of the display unit 11 is in the third position C in FIG. 3 where the display surface 11a faces the front passenger seat 3 and the occupant 2a seated in the driver's seat cannot watch the picture (step S5).

The state where the occupant 2a seated in the driver's seat 2 cannot watch the picture refers to a state where the occupant 2a is not present within the range the display surface 11a of the display unit 11 is visible. As shown in FIG. 1, when the display unit 11 is in the first position A, the occupant 2a is present within the range U where the display surface 11a is visible. When the display unit 11 is in the third position C, the occupant 2a is out of the range U where the display surface 11a is visible. That is, the conditions stored in the memory 32 assume the range U where the display surface 11a is visible. A position where the occupant 2a seated in the driver's seat 2 is placed out of the range U where the display surface 11a is visible is assumed as the third position C in FIG. 1. The range where the display surface 11a is visible and assumed when the display unit 11 is in the third position C is represented by V. In the third position C is present an occupant 3a seated in the front passenger seat 3 within the range V where the display surface 11a is visible.

In case the CPU 31 has recognized that the current position of the display unit 11 is the third position C in FIG. 1 by way of the position determination means 36 in step S5, the CPU 31 cancels display restriction by the display-in-travel restriction means 38 (Step S6). That is, even when a moving picture is displayed while the vehicle is traveling, the display surface 11a of the display unit 11 is oriented so that the occupant 2a seated in the driver's seat 2 cannot watch the display surface 11a of the display unit 11, thus display restriction is canceled.

In case the CPU 31 has determined that the display unit 11 is not oriented toward the front passenger seat 3 in step 5, the CPU 31 controls the display-in-travel restriction means 38 to restrict display in the travel state. That is, the display-in-travel restriction means 38 uses the OSD picture display means 41 to display text information as a still picture such as "ATTENTION" and "Enjoy audio information while traveling" on the display surface 11a, thereby inhibiting display of a moving picture (step S7).

Then, the CPU 31 reads, from the memory 32, the control procedure of the motor for rotation 22a shown in Table 1 to orient the display surface 11a of the display unit 11 to the third position C facing the front passenger seat 3. The CPU 31 controls the right/left angle control means 34 to perform drive control of the motor for rotation 22a at a predetermined number of rotations in a predetermined direction based on the control procedure thus read. The drive control of the motor for rotation 22a causes the rotary plate 19 to rotate by a predetermined angle in a predetermined direction thus bringing the display surface 11a of the display unit 11 to the third position C facing the front passenger seat 3 in FIG. 1 (step S8). Then execution returns to step S1 to repeat the procedure.

Execution completes Step 8 and returns to step S1 then proceeds to step S5 again. In step S5, the CPU 31 recognizes that the display unit 11 is in the third position C facing the front passenger seat 3. In case the occupant 3a is seated in the front passenger seat 3, the occupant 3a can continue watching the moving picture without the occupant 2a or 3a performing further operation to display a moving picture on the display surface 11a.

Figure 5:
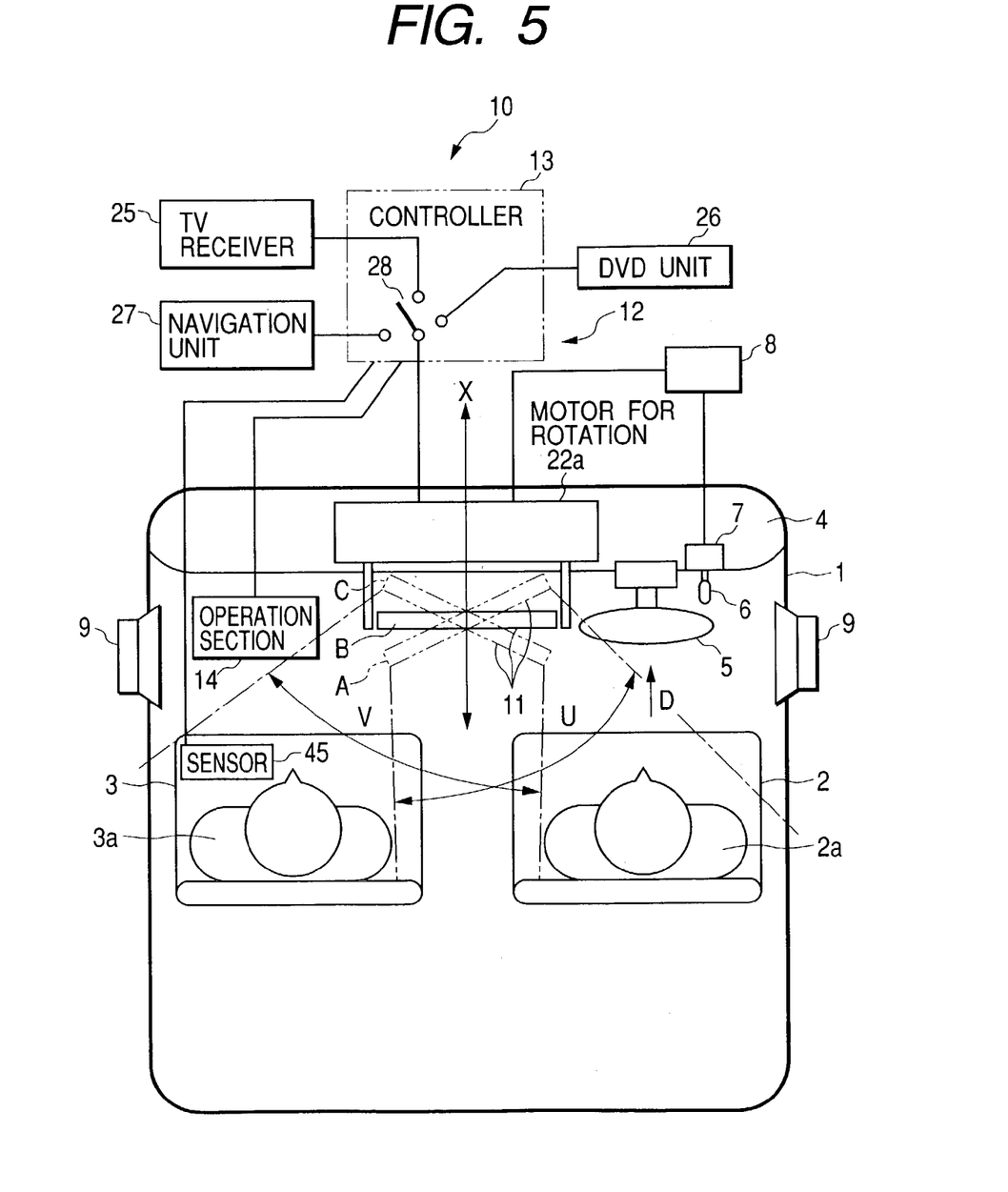
FIG. 5 is a schematic diagram showing the general configuration of a vehicle-mounted display unit according to an alternative embodiment of the invention.
Figure 6:
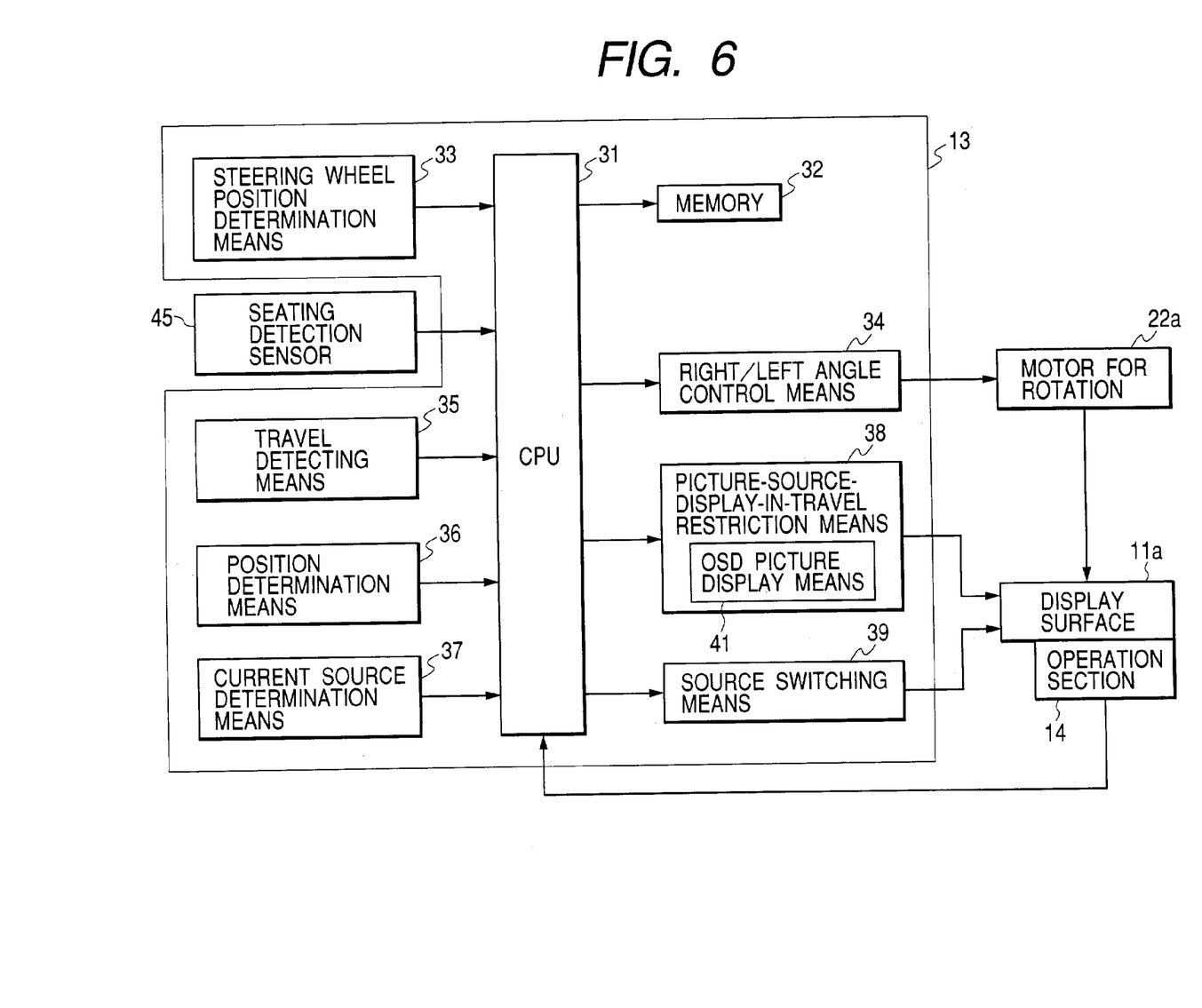
FIG. 6 is a block diagram showing a controller according to the alternative embodiment.
Figure 7:
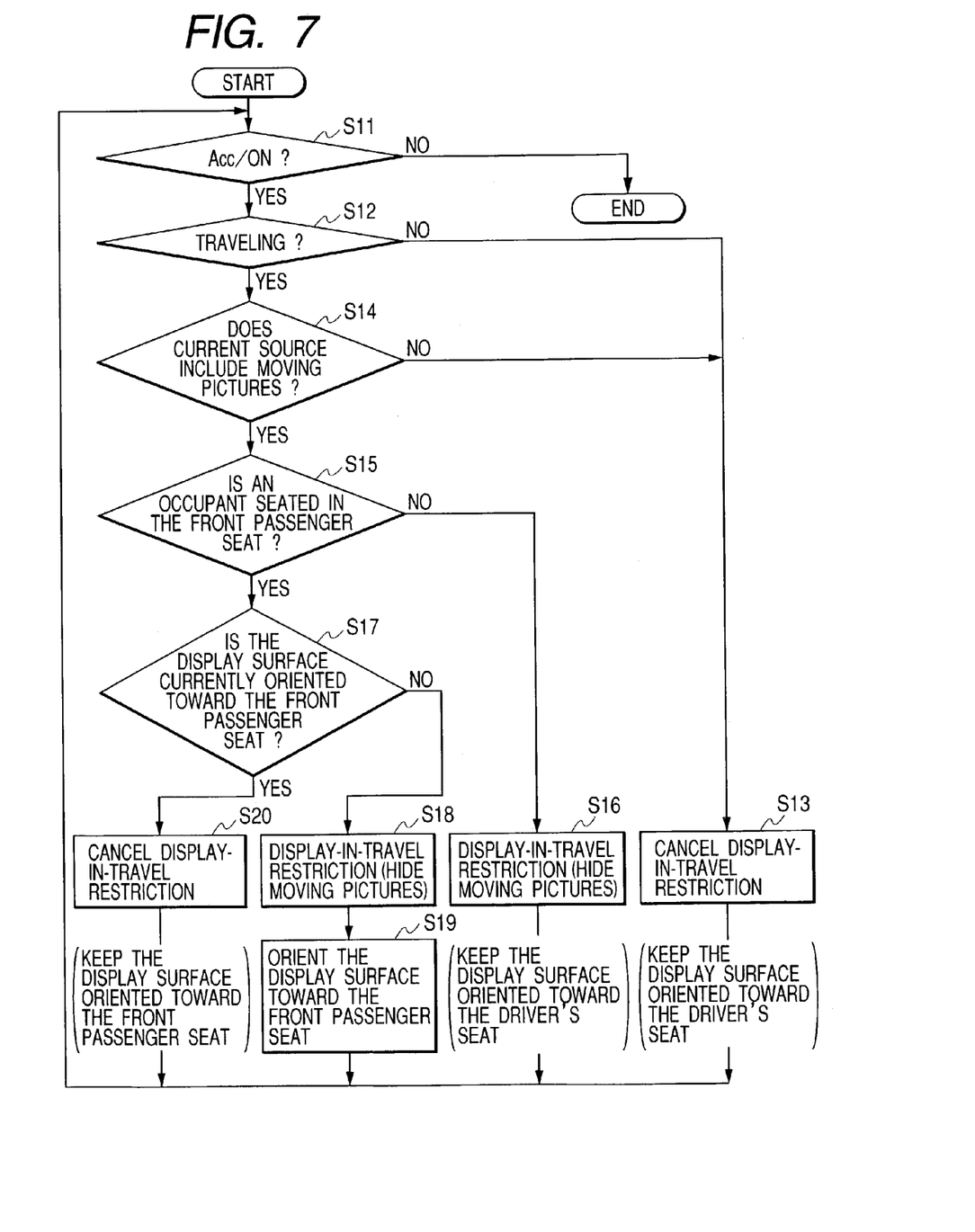
FIG. 7 is a flowchart showing the operation of a vehicle-mounted display unit according to the alternative embodiment.

Next, another embodiment of the invention will be described referring to FIGS. 5 through 7. The embodiment shown in FIGS. 5 through 7 is similar to the embodiment shown in FIGS. 1 through 4 except that a mechanism for detecting the seating state of the occupant 3a is added. The same numerals are given to the same configuration as the embodiment shown in FIGS. 1 through 4 and the corresponding description is omitted. The drive conditions for performing drive control of the number of rotations and rotating direction of the motor for rotation 22a required to rotate the display unit 11 by a predetermined angle are the same as those in Table 1 and Table 2 for the embodiment shown in FIGS. 1 through 4.

Referring to FIGS. 5 and 6, a seating detection sensor 45 is provided on the front passenger seat 3 of the vehicle 1. The seating detection sensor 45 is for example a pressure-sensitive sensor arranged on the front passenger seat 3 and is connected to the CPU 31 of the controller 13. The seating detection sensor 45, detecting that the occupant 3a is seated in the front passenger seat 3, outputs a signal to the CPU 31 of the controller 13.

In the memory 32 connected to the CPU 31 of the controller 13 are stored the control procedures of the motor for rotation 22a, that is, conditions for rotating the motor for rotation 22a at a predetermined number of rotations in a predetermined direction based on the seating state of the occupant 3a in the eat next to the driver 3.

The vehicle-mounted display unit 10 operates as shown in the flowchart of FIG. 7. Same as the first embodiment shown in FIGS. 1 through 4, an occupant 2a gets on the vehicle 1, is seated in the driver's seat 2, and operates the driving key 6 to turn on the accessory switch 7 of the vehicle 1. When the accessory switch 7 is turned on, power is supplied to the vehicle-mounted display unit 10 from the battery 8. This causes the CPU 31 of the controller 13 to recognize that the accessory switch 7 is on and power is supplied (step S11)

Then, the CPU 31 of the controller 13 reads, from the memory 32, the control procedure of the motor for rotation 22a same as that shown in Table 1 according to the embodiment of FIGS. 1 through 4 to orient the display surface la of the display unit 11 to the first position A facing the driver's seat 2. The CPU 31 controls the right/left angle control means 34 to perform drive control of the motor for rotation 22a at a predetermined number of rotations in a predetermined direction based on the control procedure thus read. The drive control of the motor for rotation 22a causes the rotary plate 19 to rotate by a predetermined angle in a predetermined direction thus bringing the display surface 11a of the display unit 11 to the first position A facing the driver's seat 2 in FIG. 1. In case the CPU 31 has determined that the current position of the display unit 11 is the first position A, the CPU 31 skips drive control of the motor for rotation 22a.

The steering wheel position determination means 33 sets and stores in the memory 32 in advance the information that the vehicle is right-hand drive. Thus, the CPU 31 drives the motor for rotation 22a so that the display unit 11 will rotate by a predetermined angle leftward toward the rear of the vehicle for example in the case of a right-hand drive vehicle shown in FIG. 5, based on the data indicating the drive conditions and position information of the steering wheel 5 read from the memory 32.

The CPU 31 of the controller 13 recognizes the travel state of the vehicle 1 detected by the travel detecting means 35, that is, whether the vehicle is traveling or halted (step S12). In case the CPU has determined that the vehicle is not traveling, that is, the vehicle is halted in step S12, the CPU 31 cancels display restriction by the display-in-travel restriction means 38 and displays a moving picture such as a TV picture on the display surface 11a of the display unit 11 (step S13). The CPU 31 recognizes that the display unit 11 is in the first position A in FIG. 1 where the display surface 11a faces the driver's seat 2, as determined by the position determination means 36, then skips the control by the right/left angle control means 34 and returns to step S11 while keeping the current state unchanged.

In case the CPU 31 has recognized that the travel detecting means 35 detected traveling of the vehicle 1 in step S12, the CPU 31 uses the source determination means 37 to determine the picture displayed on the display surface 11a of the display unit 11, that is, whether the picture is a moving picture (step S14). In case the source determination means 37 has detected that a moving picture is not displayed, the CPU 31 determines that the picture displayed on the display surface 11a is a still picture such as map information and text picture from the navigation unit 27 and executes step S13 to continue display of the still picture.

In case the CPU 31 has recognized that a moving picture such as a TV picture is displayed by way of the source determination means 37 in step S14, the CPU 31 determines whether the occupant 3a is seated in the front passenger seat 3 (step S15). In case the CPU 31 does not recognize a signal from the seating detection sensor 45 and determines that the occupant 3a is not seated in the front passenger seat 3 in step S15, the CPU 31 determines that only the occupant 2a is seated in the driver's seat 2 without recognizing the seating state of the occupant 2a in the driver's seat 2, since this determination is made after the accessory switch 7 is turned on.

The CPU 31 controls the display-in-travel restriction means 38 to restrict display in the travel state. That is, the display-in-travel restriction means 38 uses the OSD picture display means 41 to display text information as a still picture such as "ATTENTION" and "Enjoy audio information while traveling," thereby inhibiting display of a moving picture (step S16).

In the processing of step S16, the occupant 3a of the front passenger seat 3 to watch a moving picture except the occupant 2a in the driver's seat 2 is not on the vehicle. It is thus not necessary to rotate the display unit 11 so that the occupant 2a in the driver's seat 2 cannot watch the picture but the occupant 3a of the front passenger seat 3 can watch the picture. Thus, after step S16, the display unit is not rotated but execution returns to step S11.

In case the CPU 31 recognizes a signal from the seating detection sensor 45 and determines that the occupant 3a is seated in the front passenger seat 3 in step S15, the CPU 31 uses the position determination means 36 to determine the current position of the display unit 11. That is, The CPU 31 determines whether the display surface 11a of the display unit 11 is oriented in the third position C facing the seat next to the driven 3 in FIG. 3 where the occupant 2a in the driver's seat 2 cannot watch the picture (step S17).

In case the CPU 31 has determined that the display unit 11 is not oriented toward the front passenger seat 3 in step 17, the CPU 31 controls the display-in-travel restriction means 38 to restrict display in the travel state. That is, when occupants are aboard a vehicle, the display unit 11 is in the first position A where the display unit 11 faces the occupant 2a in the driver's seat 2. Thus, the display-in-travel restriction means 38 uses the OSD picture display means 41 to display text information as a still picture such as "ATTENTION" and "Enjoy audio information while traveling" on the display surface 11a, thereby inhibiting display of a moving picture (step S18).

Then, the CPU 31 reads, from the memory 32, the control procedure of the motor for rotation 22a shown in Table 1 to orient the display surface 11a of the display unit 11 to the third position C facing the front passenger seat 3. The CPU 31 controls the right/left angle control means 34 to perform drive control of the motor for rotation 22a at a predetermined number of rotations in a predetermined direction based on the control procedure thus read. The drive control of the motor for rotation 22a causes the rotary plate 19 to rotate by a predetermined angle in a predetermined direction thus bringing the display surface 11a of the display unit 11 to the third position C facing the front passenger seat 3 in FIG. 1 (step S19). Then execution returns to step S11 to repeat the procedure. In case the CPU 31 has determined that the current position of the display unit 11 is the third position C in step S17, the CPU 31 cancels display restriction (step S20) and does not drive control of the display unit 11.

The embodiment shown in FIGS. 5 through 7 has the same action and effect as those of the embodiment shown in FIGS. 1 through 4. On top of it, the embodiment, detecting that the picture on the display unit 11 is a moving picture while the vehicle 1 is traveling, rotates the display unit 11 to a position where the occupant 2a of the driver's seat 2 cannot watch the picture, that is, to the third position C in FIG. 1 facing the front passenger seat 3 after detecting the occupant 3a of the front passenger seat 3 not involved in driving the vehicle by way of the seating detection sensor 45. Thus, when a moving picture is displayed on the display unit 11 while the vehicle is traveling, the display unit 11 is automatically rotated to the third position C in FIG. 1 facing the front passenger seat 3 where the occupant 3a of the front passenger seat 3 can watch the moving picture. This automatically allows the occupant 3a of the front passenger seat 3 to watch the moving picture, thereby promising easy handling and allowing the occupant 3a of the front passenger seat 3 to watch the moving picture.

In the embodiment shown in FIGS. 5 through 7, to detect seating of the occupant 3a in the front passenger seat 3, execution may proceed to step S19 to move the display unit 11 to the third position C in FIG. 1 facing the front passenger seat 3 where the occupant 2a of the driver's seat 2 cannot watch the picture, without hiding the picture.

Driver detecting means arranged on the driver's seat 2 for detecting seating of the occupant 2a of the driver's seat 2 may be provided, and by using this means together with the seating detection sensor 45 arranged on the front passenger seat 3 for detecting seating of the occupant 3a, it is possible to configure crew detecting means for detecting the seating state of the occupant 2a of the driver's seat 2 and the occupant 3a of the front passenger seat 3. In this way, it is possible to change the orientation of the display unit 11 so that the display unit 11 will be oriented toward the middle point between the driver's seat 2 and the front passenger seat 3, namely the second position B in FIGS. 1 and 5, to let the occupant 3a of the front passenger seat 3 watch the display, in the case of a still picture such as map information from the navigation unit 27. This provides fine-tuned control depending on the seating state of the occupant 2a of the driver's seat 2 and the occupant 3a of the front passenger seat 3, thereby promising upgraded convenience.

The invention is not limited to the aforementioned embodiments but includes the variants as long as the object of the invention is attained.

According to the invention, control means is used to determine that the vehicle is traveling and that the display surface of the display unit is oriented to allow an occupant seated in the driver's seat to watch a picture, as well as inhibit the display of a picture on the display unit in case the picture is determined to be a moving picture, thus assuring stable traveling of the vehicle. In case another occupant is seated in the front passenger seat and the display surface of the display unit is oriented toward the occupant, it is permitted to display a moving picture, which allows the occupant to watch a moving picture while the vehicle is traveling.

According to the invention, in case the control means has determined that the vehicle is traveling and the picture on the display unit is a moving picture, the display unit is moved to an orientation where the occupant of the driver's seat cannot watch the picture. Therefore, to display a moving picture while the vehicle is traveling, the display surface of the display unit is oriented automatically and without operation so that the driver cannot watch the display surface of the display unit. For example, in a state where another occupant can watch a moving picture while the occupant of the driver's seat cannot, the former occupant can automatically watch the moving picture. This promises easy handling and allows the occupant to watch a moving picture even while the vehicle is traveling.

What is claimed is:

1. A display controller, comprising:
   a display mounted on a vehicle, having a display surface to display at least moving pictures;
   a travel state detector that detects a travel or a halt of the vehicle;
   a drive section that drives the display to change an orientation of the display surface;
   an orientation detector that detects the orientation of the display surface;
   a determination section that determines whether a picture displayed on the display surface is a moving picture; and
   a controller that inhibits display of a moving picture displayed on the display surface when travel of the vehicle is detected, and the picture displayed on the display surface is determined to be a moving picture, and the orientation of the display surface is detected to be toward an occupant seated in a driver's seat of the vehicle.

2. The display controller according to claim 1, further comprising:
   a seating position detector that detects a seating position of at least one of occupants of a vehicle;
   wherein the controller cancels inhibition of display of the moving picture when the occupant is detected to be seated on a front passenger seat of the vehicle and the orientation of the display surface is detected to be toward the occupant seated on the front passenger seat.

3. A drive controller, comprising:
   a display, mounted on a vehicle, having a display surface to display at least moving pictures;
   a drive section that drives the display to change an orientation of the display surface;
   an orientation detector that detects the orientation of the display surface;

a determination section that determines whether the picture displayed on the display surface is a moving picture;

a travel state detector that detects a travel or a halt of the vehicle; and a controller that performs drive control of the display so as to orient the display surface to a position where an occupant in a driver's seat cannot watch the display surface when travel of the vehicle is detected, and the picture displayed on the display surface is determined to be a moving picture, and the orientation of the display surface is detected to be toward an occupant seated in the driver's seat of the vehicle.

4. The drive controller according to claim 3, further comprising:

a seating position detector that detects a seating position of at least one of the occupants of the vehicle;

wherein the controller performs drive control of the display to a position where the display surface is oriented toward the occupant of a front passenger seat of the vehicle on detecting that the occupant is seated on the front passenger seat.

5. A display control method for controlling display on a display surface of a display mounted on a vehicle, wherein the display surface of the display displays at least moving pictures and is driven to change an orientation thereof, the method comprising:

detecting a travel or a halt of the vehicle;

determining whether the picture displayed on the display surface is a moving picture;

detecting the orientation of the display surface; and inhibiting display of the moving picture on detecting that the vehicle is traveling, and that the picture displayed on the display surface is a moving picture, and that the orientation of the display surface is toward an occupant seated in a driver's seat of the vehicle.

6. A drive control method for performing drive control of a display mounted on a vehicle, wherein the display has a display surface to display at least moving pictures, and the drive control includes a change in the orientation of the display surface, the method comprising:

detecting a travel or a halt of the vehicle;

determining whether the picture displayed on the display surface is a moving picture;

detecting the orientation of the display surface; and driving the display to orient the display surface so that an occupant in a driver's seat cannot watch the display surface on detecting that the vehicle is traveling, and that the picture displayed on the display surface is a moving picture, and that the orientation of the display surface is toward an occupant seated in the driver's seat.

* * * * *